March 13, 1956  W. F. CHEVIRON  2,738,408
ELECTRIC DEFROSTING UNIT FOR VEHICLES
Filed Feb. 28, 1955
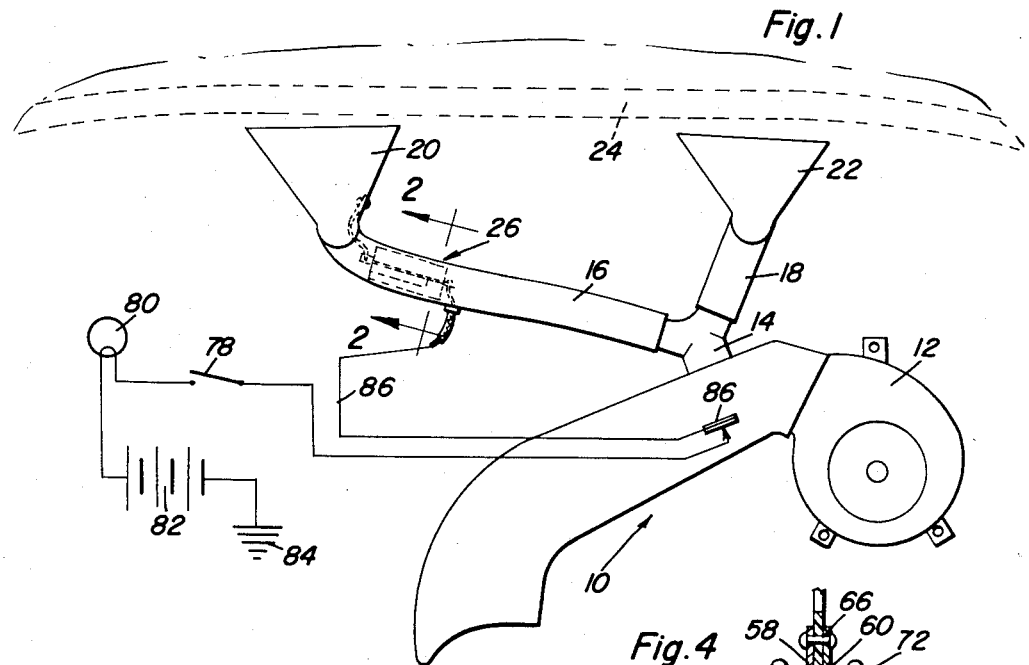
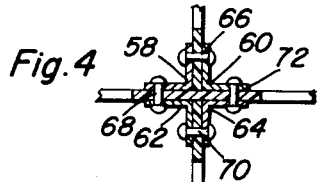
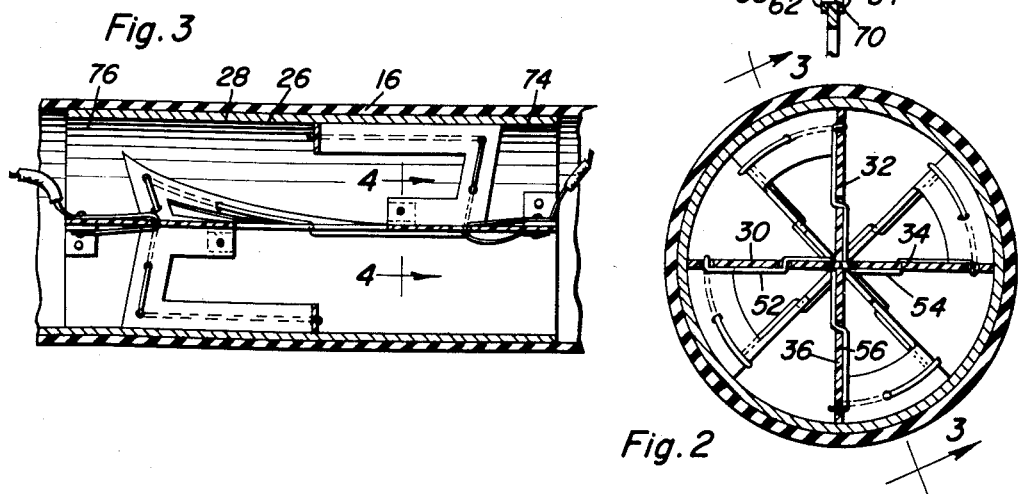
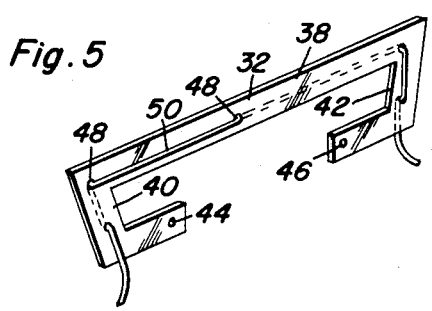
Wayne F. Cheviron
INVENTOR.

United States Patent Office 2,738,408
Patented Mar. 13, 1956

2,738,408

ELECTRIC DEFROSTING UNIT FOR VEHICLES

Wayne F. Cheviron, Joliet, Ill.

Application February 28, 1955, Serial No. 491,078

2 Claims. (Cl. 219—19)

This invention relates to an accessory for vehicles such as automobiles, trucks and the like, and more particularly to a device adapted to be installed in the conduits of the defroster assembly which is connected to a conventional hot air heater of a vehicle.

The primary object of the present invention resides in the provision of means for providing a continuous flow of hot air substantially instantaneously and even before the fluid in the radiator of the vehicle has become warm enough so that the hot air heater can provide the necessary warm air for efficient operation of the defroster.

A further object of the invention resides in the provision of an electric defroster unit for installation in various type of vehicles which includes suitable electric circuits and includes switch means for automatically opening the circuit to the defroster unit when sufficient hot air is being produced by the hot air heater.

A further object of this invention resides in the provision of a defroster unit adapted to be inserted in the conduits of a defroster assembly and which defroster includes vanes arranged so as to provide an optimum frontal surface to thereby efficiently heat the air blown therepast by the hot air heater without unduly restricting flow of air.

Still further objects and features of this invention reside in the provision of an electric defrosting unit for vehicles that is simple in construction, highly efficient in operation, easy to install, and relatively inexpensive to manufacture thereby permitting wide distribution and utilization.

These, together with the various ancillary objects and features of the invention which will become apparent as the following description proceeds, are attained by this electric defrosting unit for vehicles, a preferred embodiment of which has been illustrated in the accompanying drawings, by way of example only, wherein:

Figure 1 is a schematic diagram illustrating the manner in which the defroster unit can be associated with a conventional hot air heater and associated defroster assembly;

Figure 2 is a sectional detail view as taken along the plane of line 2—2 in Figure 1 illustrating the construction of the defroster unit and being shown in an enlarged scale for clarity;

Figure 3 is a sectional detail view as taken along the plane of line 3—3 in Figure 2 showing the construction of the defroster unit in a slightly reduced scale;

Figure 4 is an enlarged sectional detail view as taken along the plane of line 4—4 in Figure 3 illustrating the connection between the various vanes; and Figure 5 is a perspective view of one of the vanes with associated heating wires.

With continuing reference to the accompanying drawings wherein like reference numerals designate similar parts throughout the various views, reference numeral 10 is used to generally designate a conventional heater system adapted to be installed on a vehicle which includes a hot air heater 12 including a blower which is adapted to direct suitable amounts of air through a conduit 14 which may have branch conduits as at 16 and 18 of any suitable number and which is adapted to direct air into outlet vents or funnels 20 and 22 adjacent the windshield 24 and any other suitable glassed in areas as may be desired. Obviously, the auxiliary defroster unit 26 which comprises one of the main elements of the present inventiton can be associated with any of the branches 16, 18, etc. of the defroster assembly as may be desired, the defroster unit being shown inserted in the conduit branch 16 by way of example only.

The auxiliary defroster unit 26 may be formed of a sleeve 28 of metal or any other suitable material adapted to be inserted and resiliently held in place by the material from which the conduit branch 16 is constructed, which is generally formed of rubber or the like.

Within the sleeve 28 there is mounted a plurality of insulating vanes 30, 32, 34 and 36, each of which may be generally C-shaped as can be best seen in Figure 5. As can be seen in Figure 5, the vane 32 includes a central connecting portion 38 interconnecting a pair of L-shaped portions 40 and 42 which have apertures as at 44 and 46 therethrough. Threadedly inserted through various apertures as at 48 in the vane 32 are heating wires or resistance elements 50. The vane 30 is provided with resistance elements 52 and the vanes 34 and 36 have resistance elements 54 and 56 carried thereby. If desired, the generally horizontally disposed vanes 30 and 34 may be integrally formed with each other. Substantially L-shaped brackets 58, 60, 62 and 64 are provided and suitable rivets 66, 68, 70 and 72 are utilized to tie these brackets to the respective vanes, the rivets extending through the apertures, such as the apertures 44 and 46 in the vane 32.

It is noted that the vanes 30, 32, 34 and 36 are bent or twisted so as to be longitudinally inclined with respect to the axis of the sleeve 28 from the inlet end 74 to the discharge end 76 of the sleeve 28. This assures that a considerable frontal area is provided while not preventing flow of an adequate quantity of the air through the sleeve 28 so that it may become heated by the heating wires and by contact with the vanes which have been heated by the wires.

The heating wires are connected to a manually operable switch 78 and an indicator lamp 80 to a battery 82 which is grounded as at 84 and through a conductor 86 to a temperature responsive switch 86 installed in the heater system 12 so that when the heater 12 blows warm enough air over the thermostatic element 86 which would be normally directed through the conduit branches 16 and 18, the switch 86 will automatically open the circuit between the battery 82 and the heating wires thereby stopping further operation of the auxiliary heating unit and conserving on electrical power when the additional heat for the air sent through the defroster discharge funnels 20 and 22 no longer need be heated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. In combination with a vehicle hot air heater and a windshield defroster assembly including at least one conduit connecting said heater with at least one defroster outlet, an auxiliary defrosting unit including a sleeve receivable in said conduit, a plurality of insulating vanes in said sleeve, and resistance heating wires carried by said vanes, said heating wires being connected to a source of electrical power, said vanes being longitudinally inclined with respect to said sleeve to provide increased frontal surface, and switch means for completing and opening an operative electrical circuit between said heating wires and said source of electrical power, said switch means including a manual switch and a temperature responsive switch associated with said heater.

2. In combination with a vehicle hot air heater and a windshield defroster assembly including at least one conduit connecting said heater with at least one defroster outlet, an auxiliary defrosting unit including a sleeve receivable in said conduit, a plurality of insulating vanes, each of said vanes being substantially C-shaped and arranged in radially extending relationship in said sleeve, and resistance heating wires carried by said vanes, said heating wires being connected to a source of electrical power, said vanes being longitudinally inclined with respect to said sleeve to provide increased frontal surface, and switch means for completing and opening an operative electrical circuit between said heating wires and said source of electrical power.

References Cited in the file of this patent
UNITED STATES PATENTS

| | | |
|---|---|---|
| 1,465,292 | Wessig | Aug. 21, 1923 |
| 1,985,136 | Amoo | Dec. 18, 1934 |
| 2,121,754 | Cornell, Jr. | June 21, 1938 |
| 2,133,488 | Stearns | Oct. 18, 1939 |
| 2,428,079 | Hooper | Sept. 30, 1947 |